US007369844B2

(12) United States Patent
Hestir

(10) Patent No.: US 7,369,844 B2
(45) Date of Patent: May 6, 2008

(54) SUPPLEMENTARY CALL GRABBER SERVICE FOR MOBILE NETWORKS

(75) Inventor: Kristen Lee Hestir, Lier (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1292 days.

(21) Appl. No.: 10/101,088

(22) Filed: Mar. 20, 2002

(65) Prior Publication Data

US 2003/0008643 A1 Jan. 9, 2003

(30) Foreign Application Priority Data

Mar. 22, 2001 (NO) .................................. 20011465

(51) Int. Cl.
*H04M 3/42* (2006.01)
*H04M 1/00* (2006.01)
*H04Q 7/20* (2006.01)
*H04B 1/38* (2006.01)

(52) U.S. Cl. ................ 455/417; 455/432.3; 455/456.3; 455/565

(58) Field of Classification Search .............. 455/417, 455/433, 456.3, 565, 432.3
See application file for complete search history.

(56) References Cited

U.S. PATENT DOCUMENTS

| 5,878,343 | A   | * | 3/1999  | Robert et al. ........... 455/424 |
| 5,978,673 | A   | * | 11/1999 | Alperovich et al. ...... 455/417 |
| 6,314,284 | B1  | * | 11/2001 | Patel et al. .............. 455/417 |
| 6,363,430 | B1  | * | 3/2002  | Thomas ................... 409/245 |
| 6,594,230 | B1  | * | 7/2003  | Yaker .................... 370/221 |
| 6,603,849 | B2  | * | 8/2003  | Lin et al. ............ 379/221.01 |
| 6,795,444 | B1  | * | 9/2004  | Vo et al. ................ 370/401 |
| 6,862,626 | B1  | * | 3/2005  | Ryu ...................... 709/227 |
| 7,130,643 | B2  | * | 10/2006 | Bates et al. ........... 455/456.1 |
| 2003/0119500 | A1 | * | 6/2003 | Mukherjee et al. ....... 455/433 |
| 2004/0176103 | A1 | * | 9/2004 | Trossen et al. ......... 455/456.3 |
| 2006/0140200 | A1 | * | 6/2006 | Black et al. ............ 370/401 |
| 2006/0280169 | A1 | * | 12/2006 | Mahdi .................... 370/352 |

* cited by examiner

*Primary Examiner*—Fan Tsang
*Assistant Examiner*—Lisa Hashem
(74) *Attorney, Agent, or Firm*—Nixon & Vanderhye P.C.

(57) ABSTRACT

A method and arrangement in a telecommunication network according to "GSM on the Net" or "IPT" intercepts an incoming call for a user registered at an access node for which an intercept service is active. Depending on the type of called party identifier provided with the incoming call, the call is routed to the Service Node. The service node identifies an alias of the access node and sends the access node alias with called party data to the application node. The application node returns to the service node a divert-to identifier associated with the access node, and the service node delivers the call to a different access node identified by the divert-to identifier.

8 Claims, 14 Drawing Sheets

User Registration- GSM Access Node

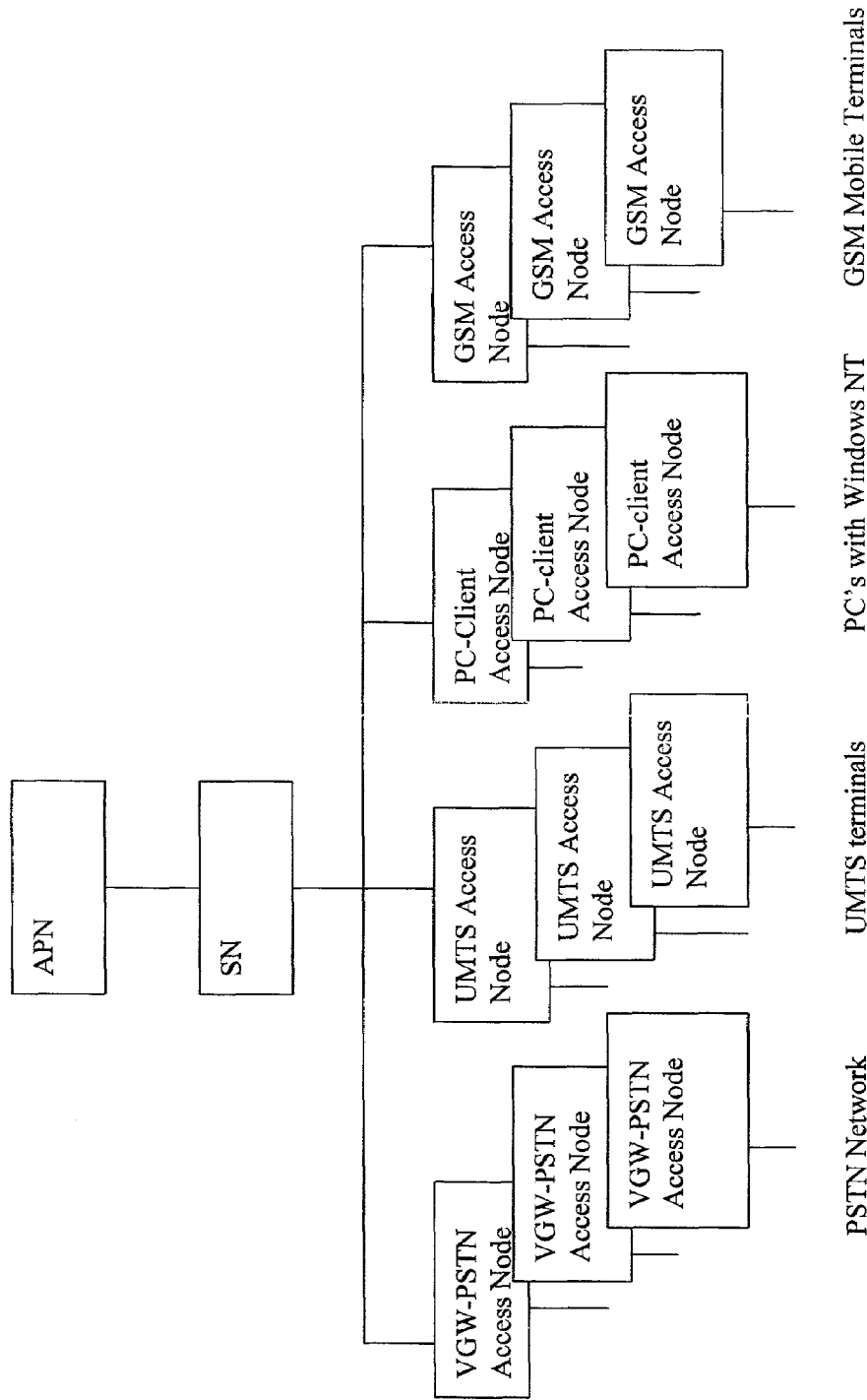
Figure 1: IPT/GSM on the Net Architecture

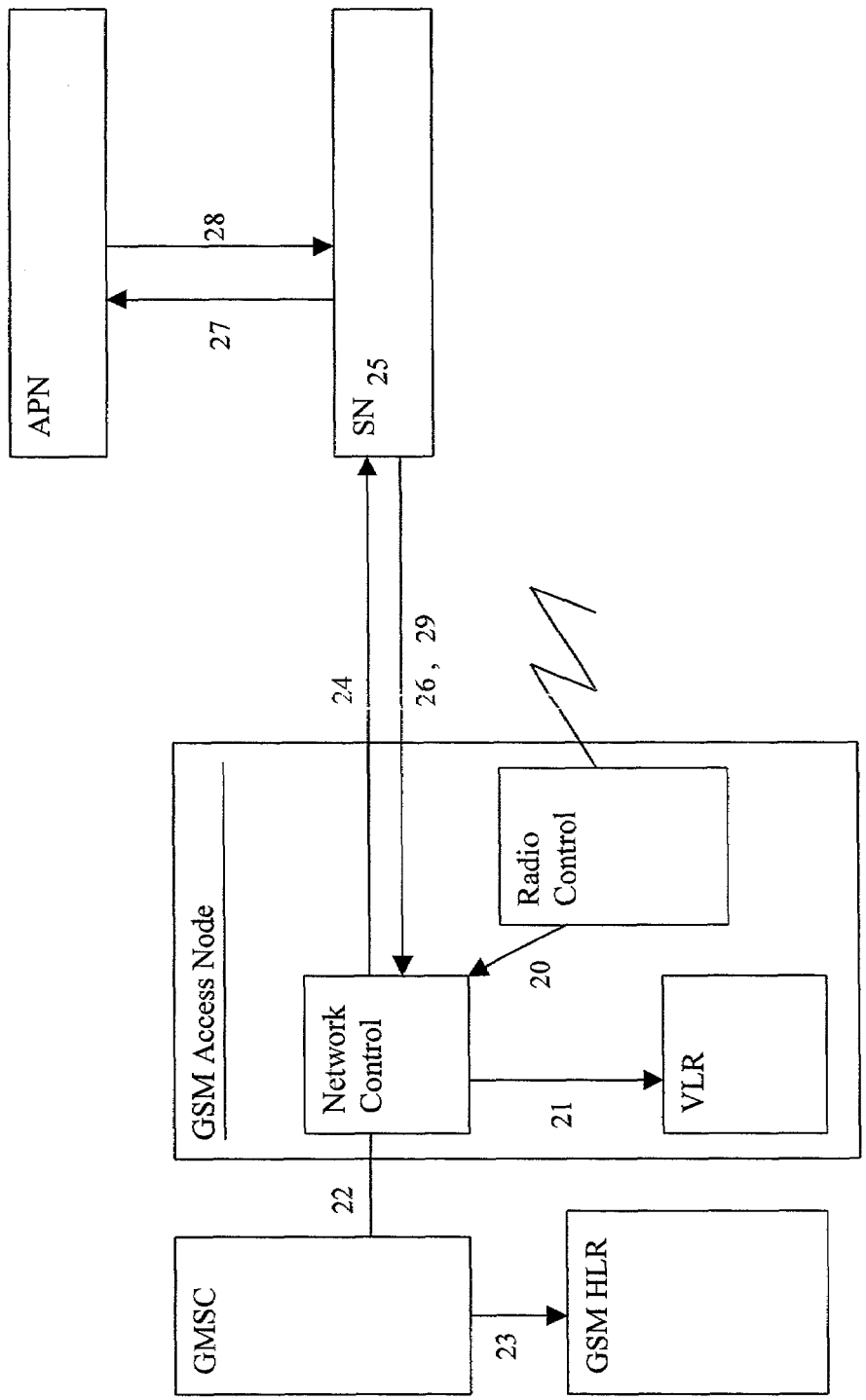
Figure 2. User Registration- GSM Access Node

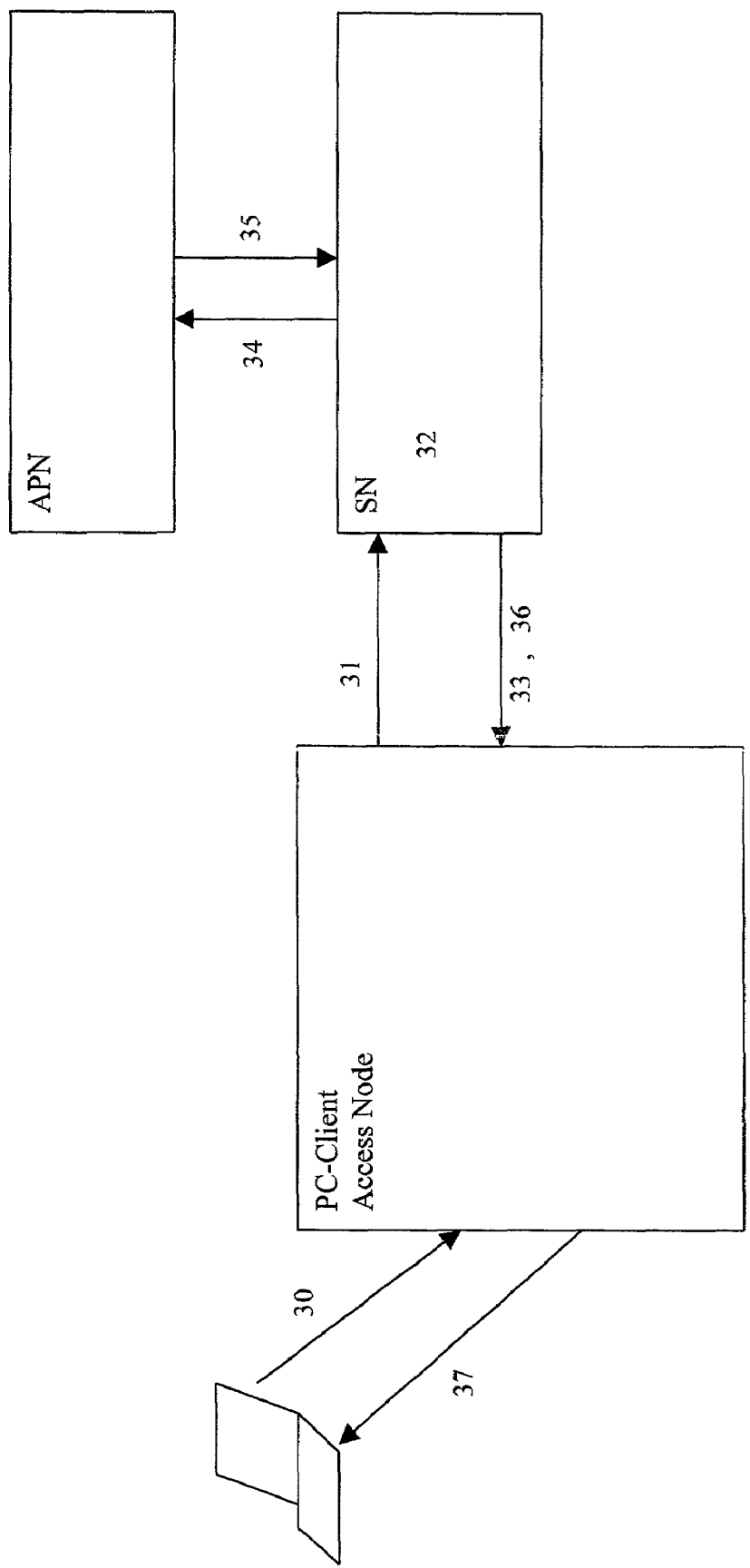
Figure 3. User Registration at an Access Node Handling Fixed Terminals

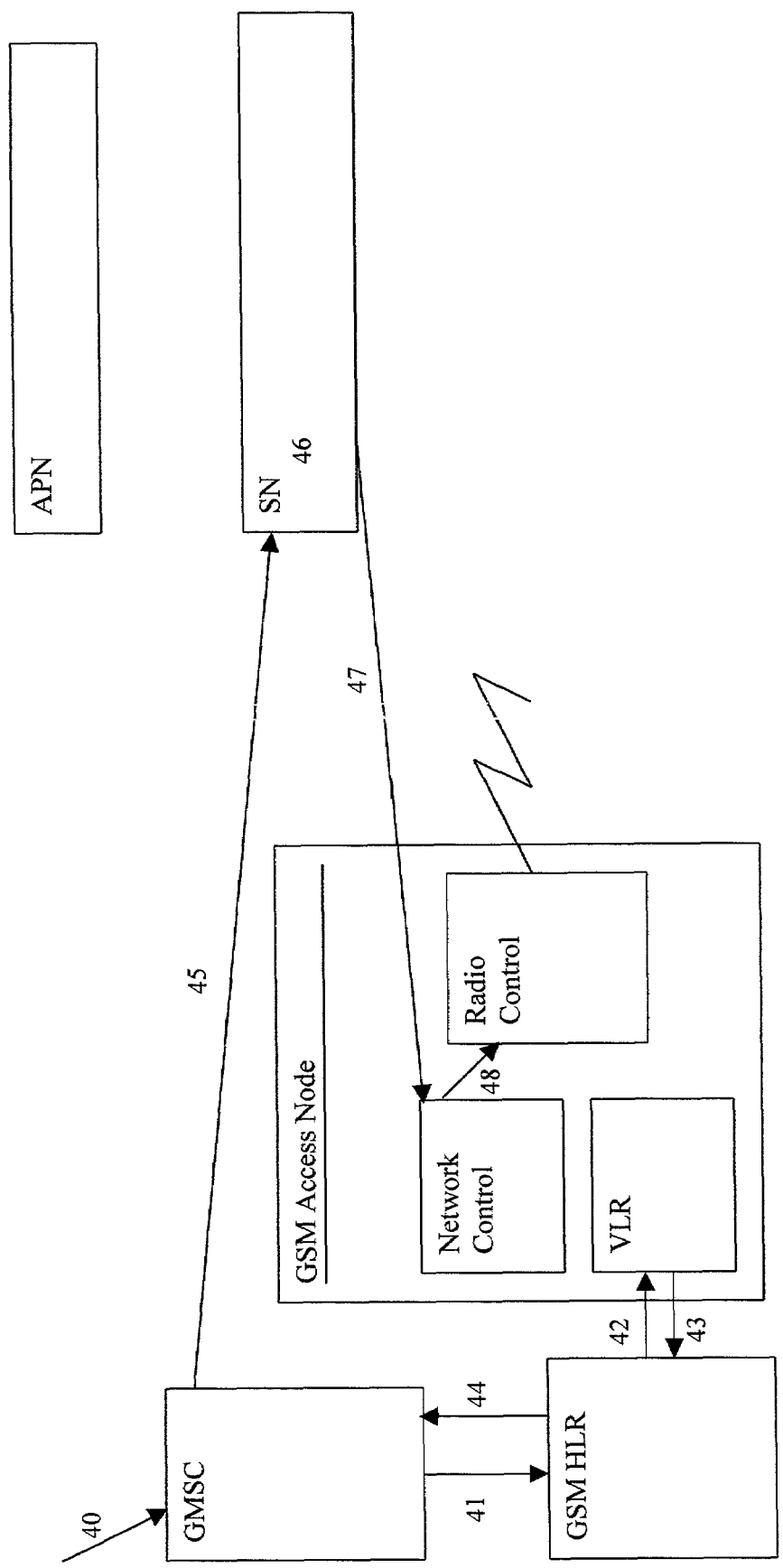
Figure 4. Incoming MSISDN call to User with a User Alias (the mobile is within GSM Access Node Coverage Area)

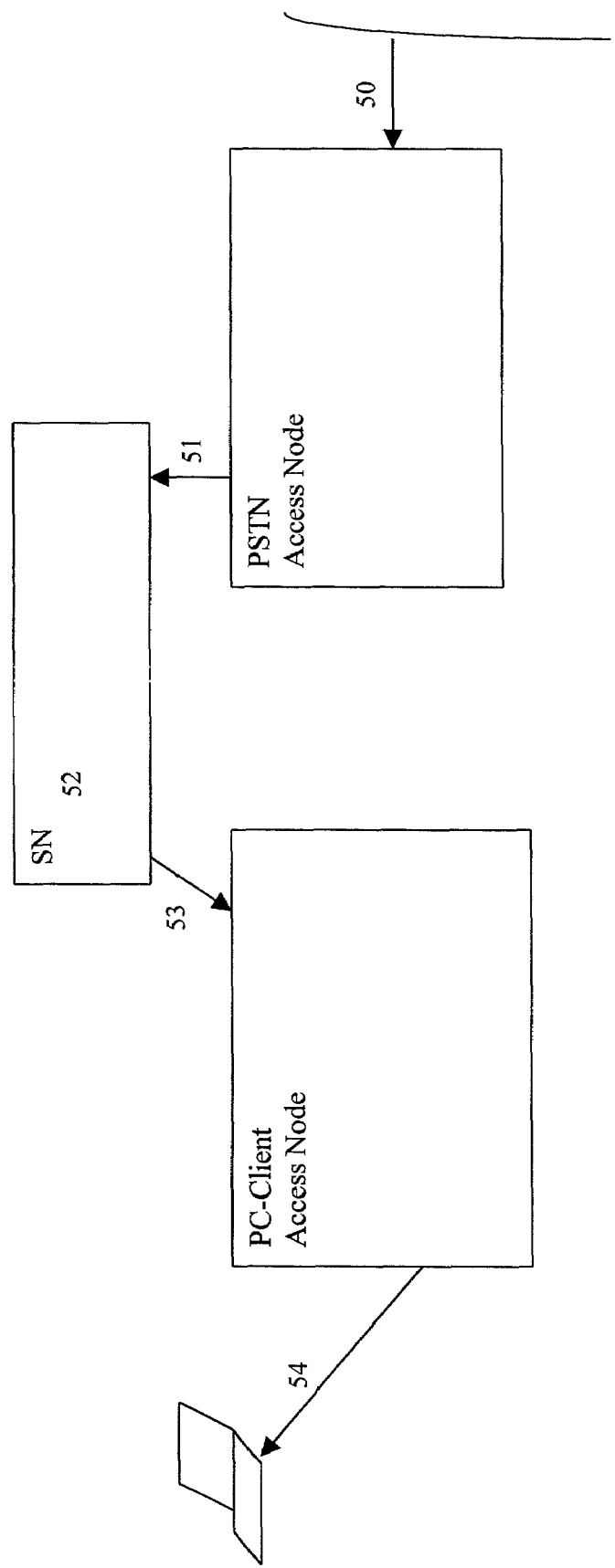
Figure 5. Incoming Call to User Alias

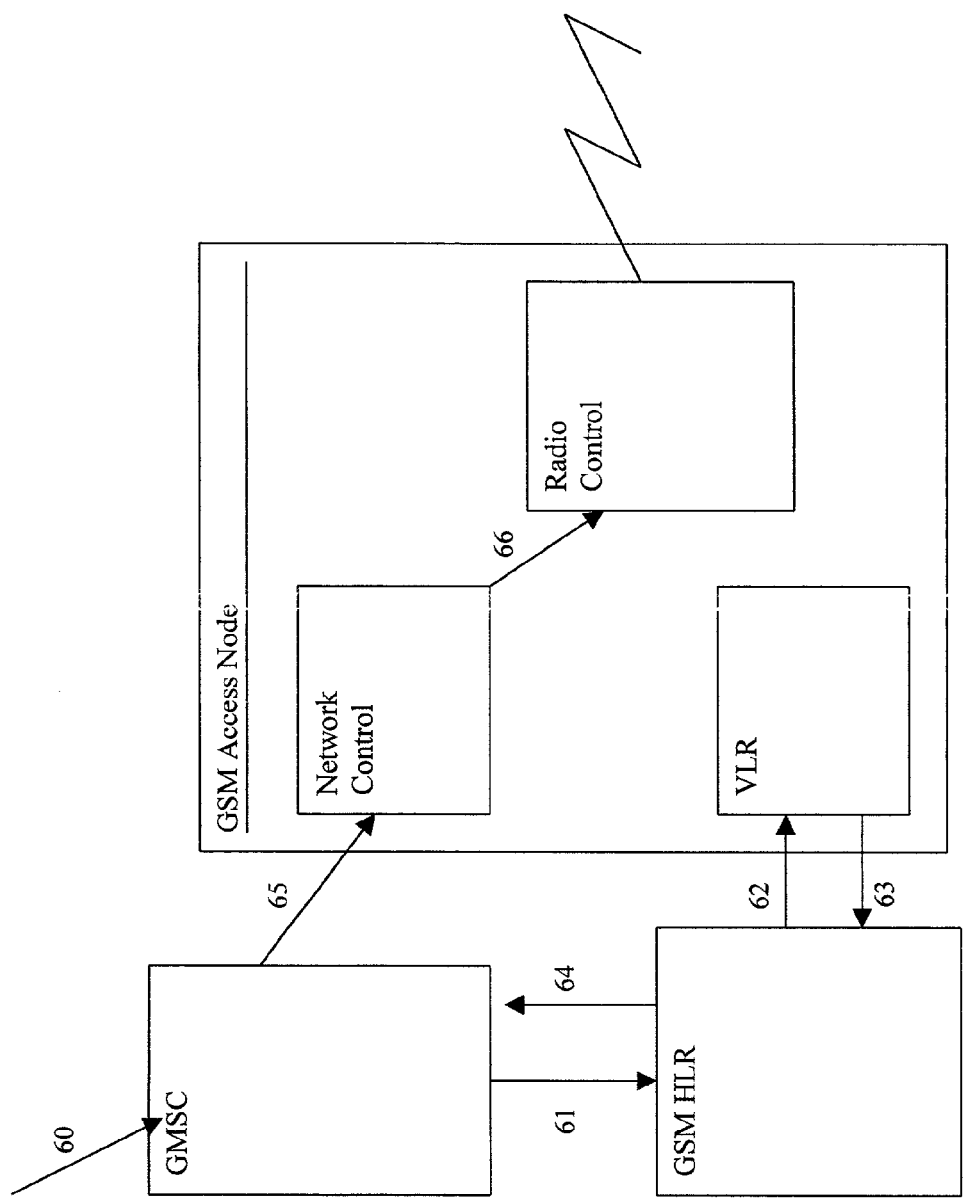
Figure 6. Incoming MSISDN Call to a User without a User Alias (a terminal that is roaming into GSM Access Node coverage area)

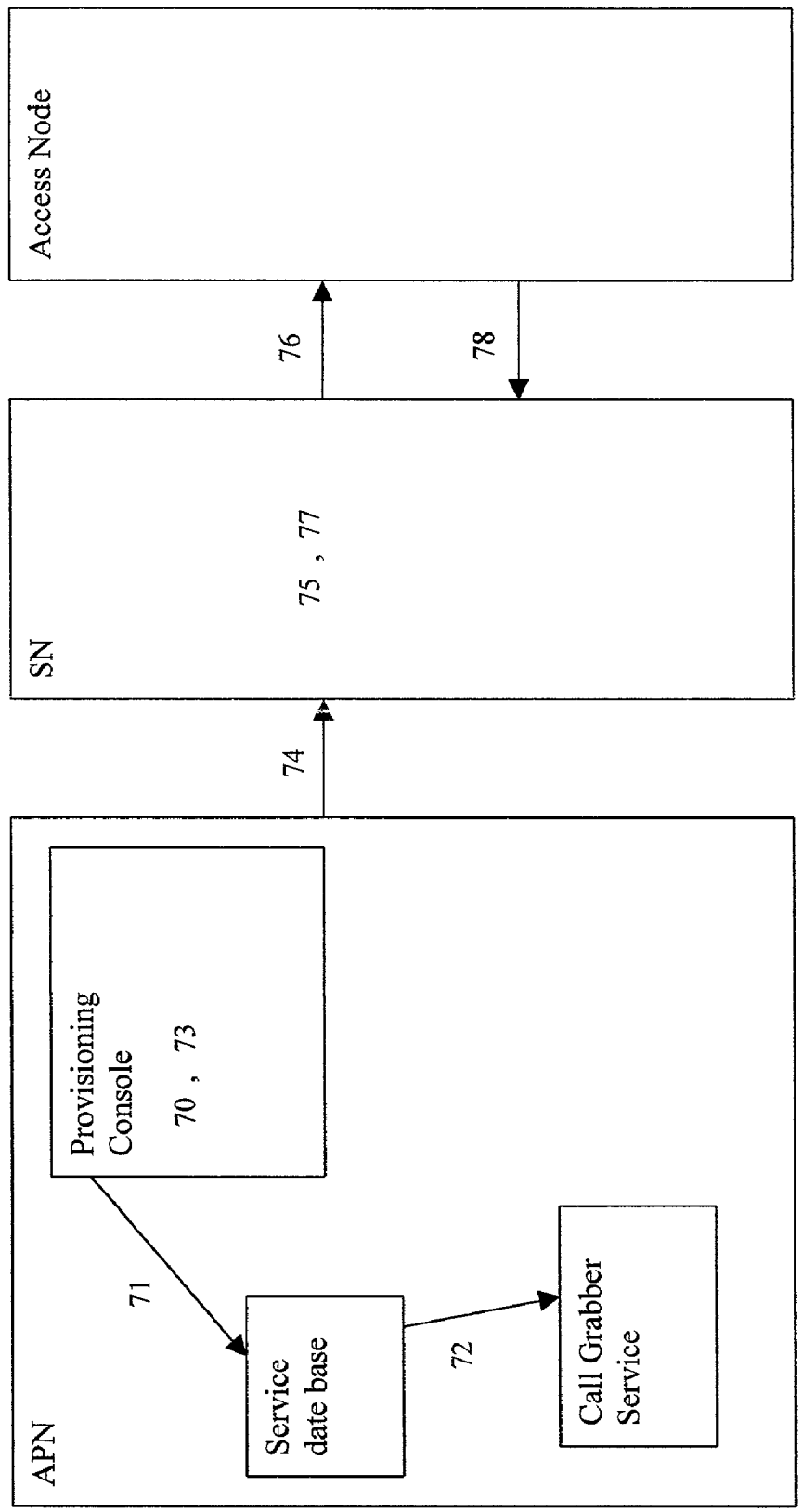
Figure 7. Subscription and Activation of Call Grabber

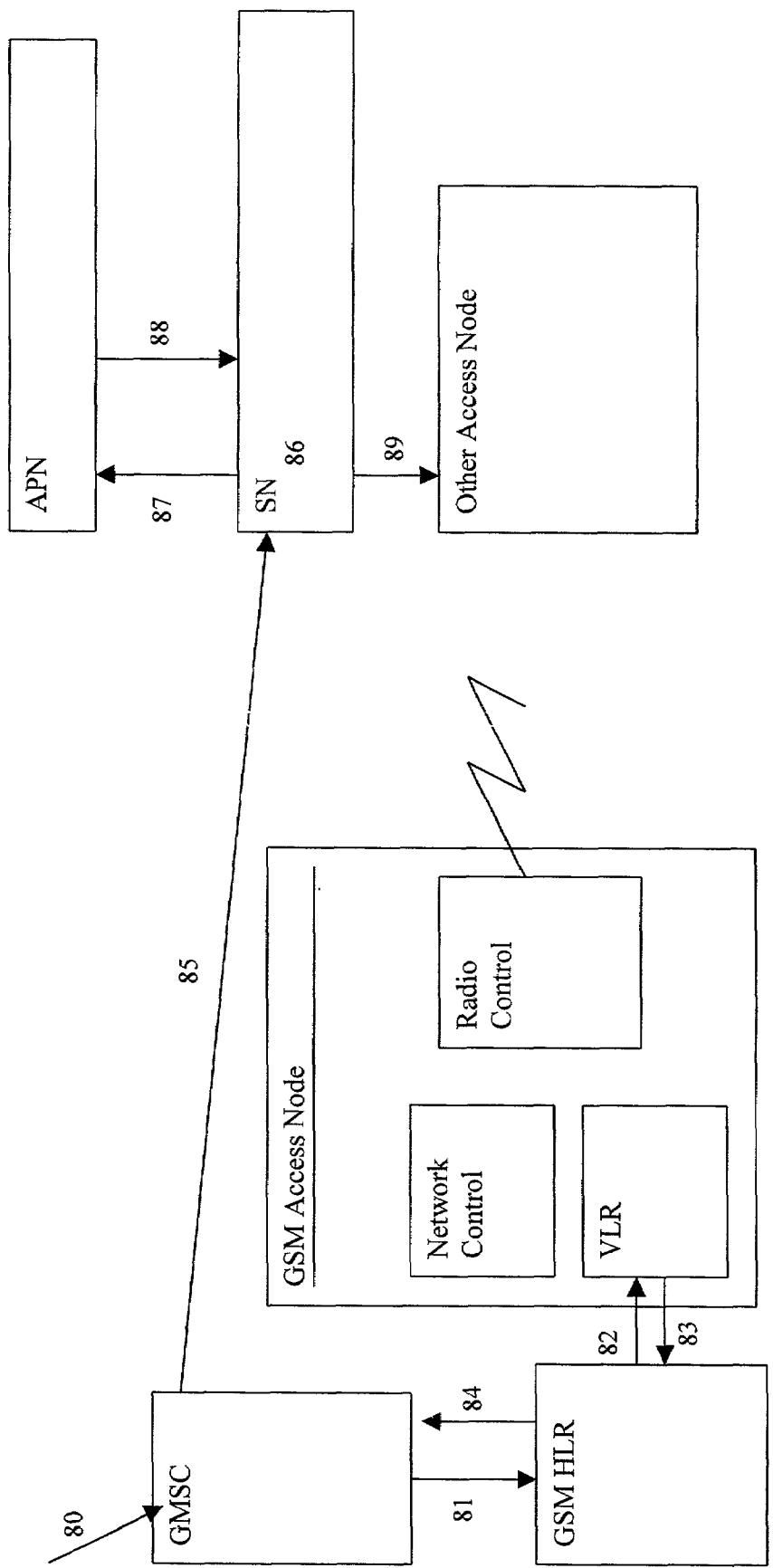
Figure 8. Incoming MSISDN call to a User with a User Alias, Call Grabber Active

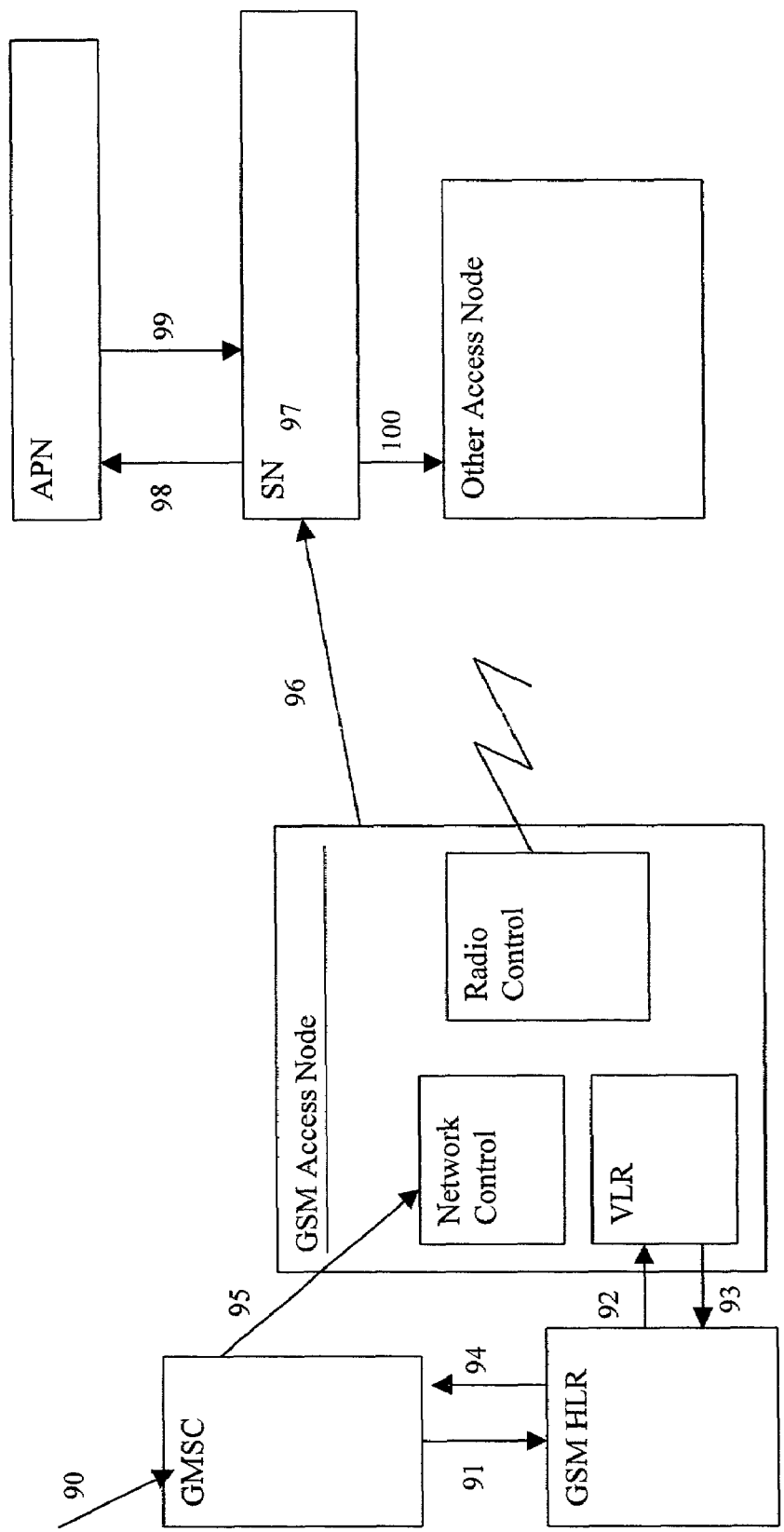
Figure 9. Incoming MSISDN call to a User without a User Alias, Call Grabber Active

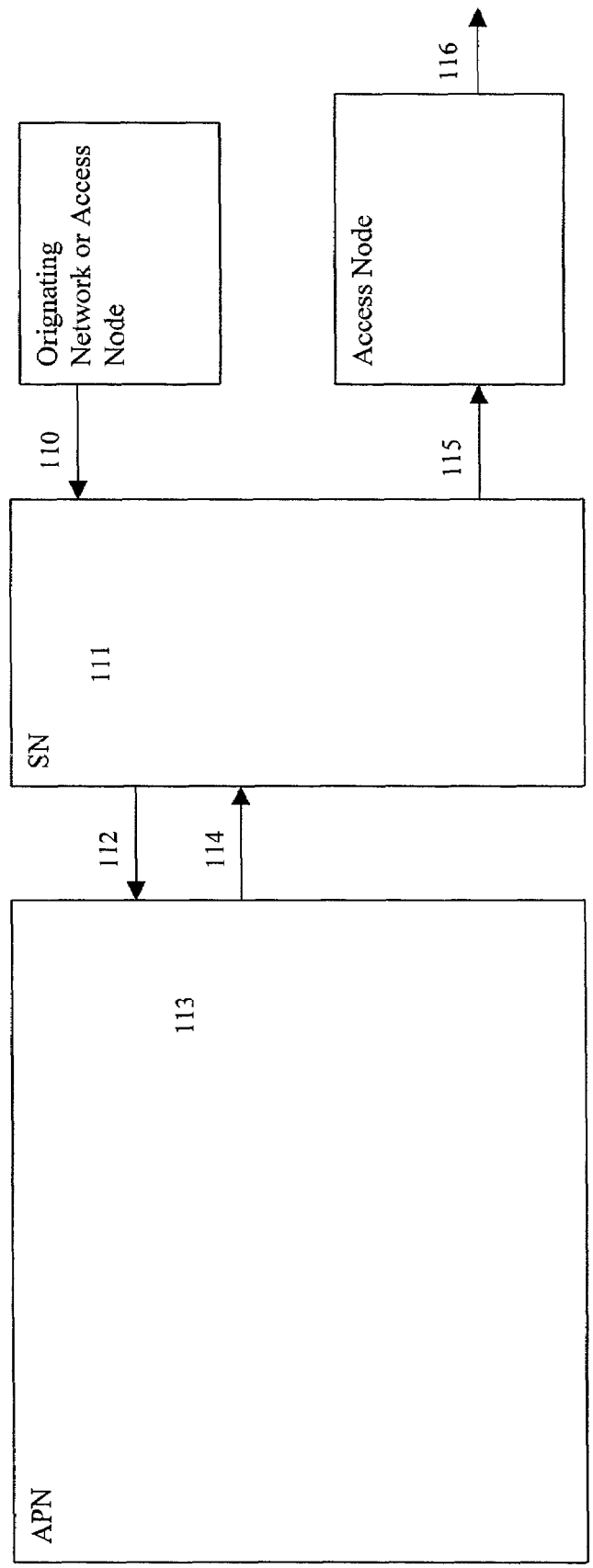
Figure 10. Incoming Call to User Alias, Call Grabber Active

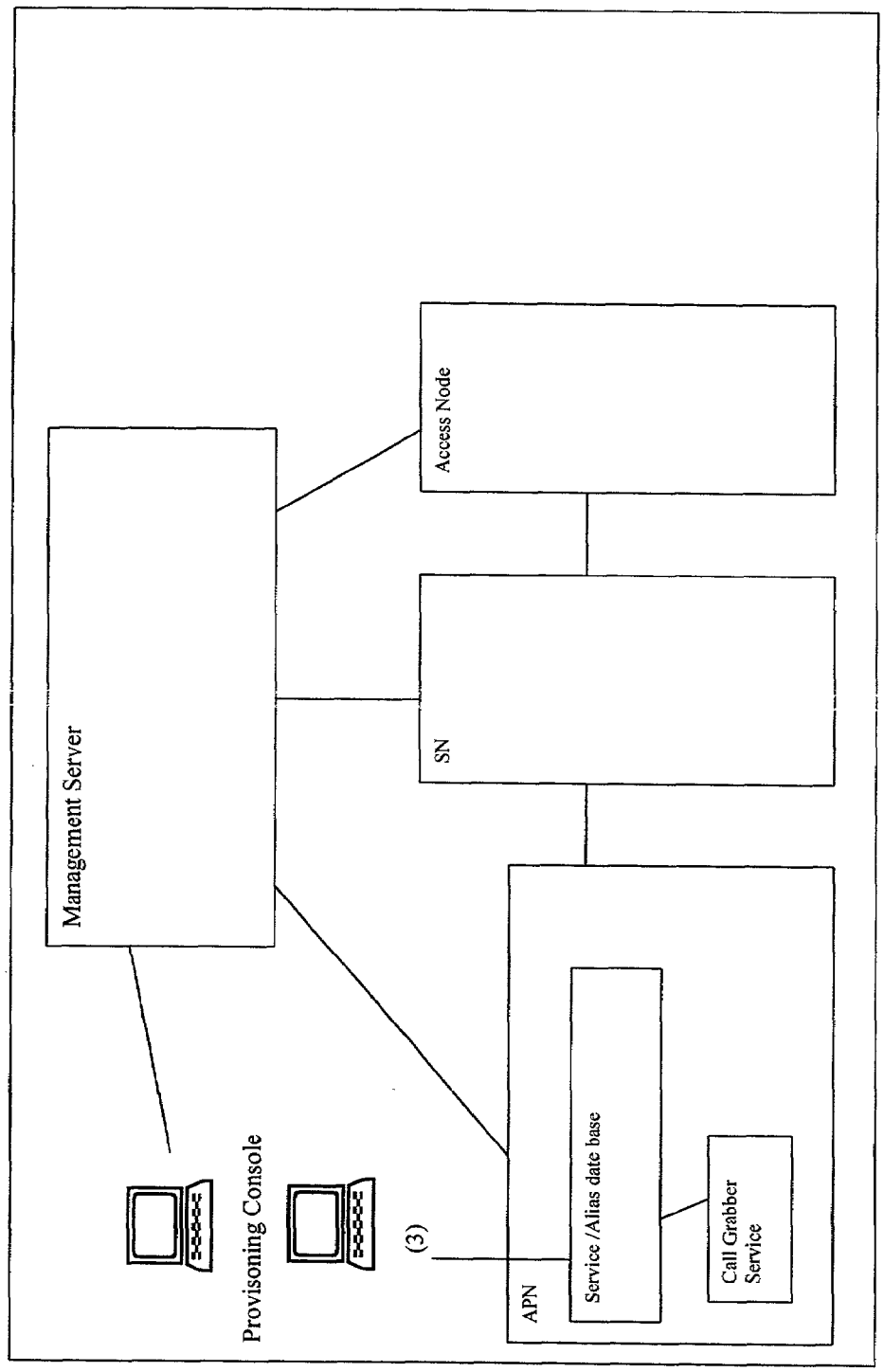
Figure 11: Provisioning of Access Node Alias via Management Console and Provisioning Console

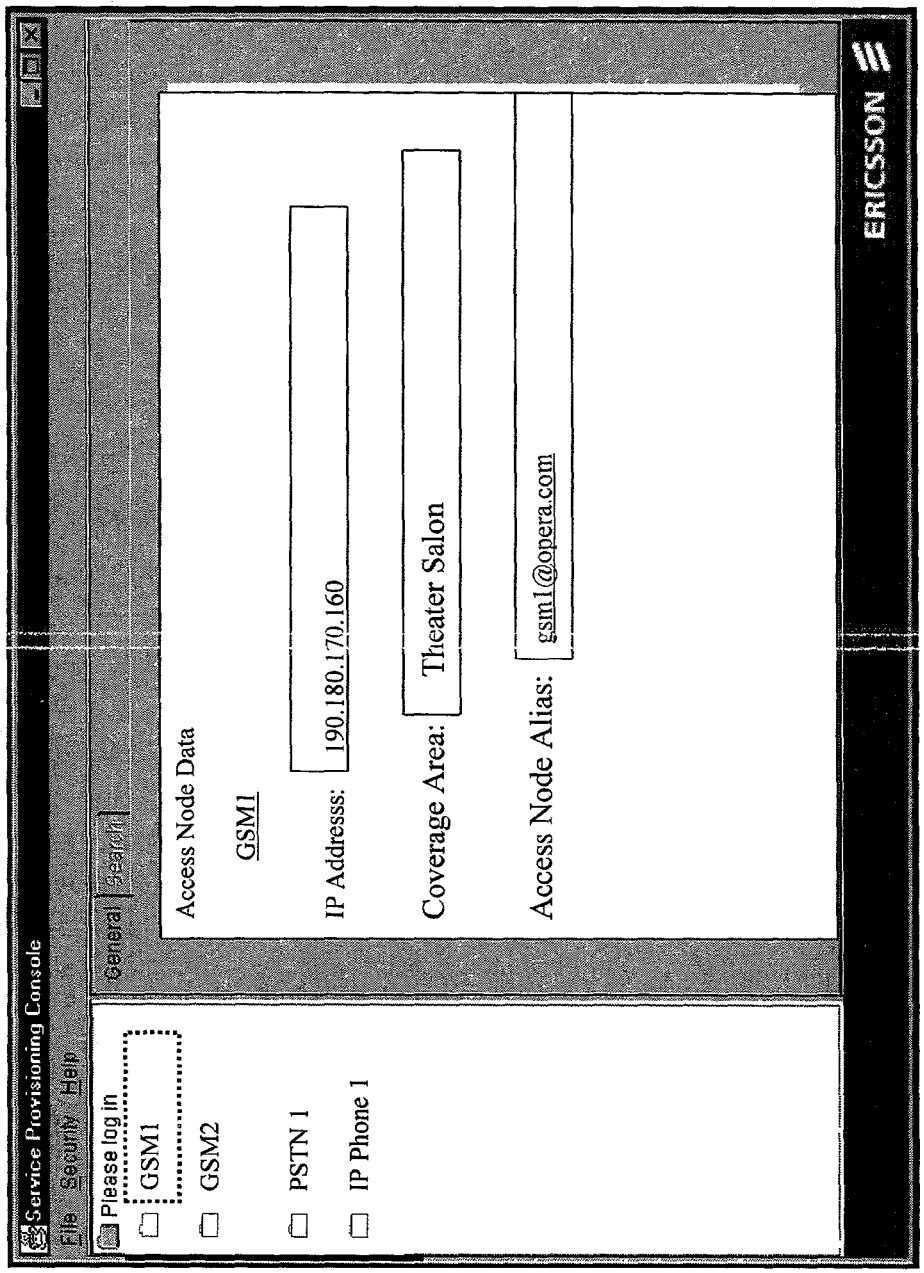
Figure 12: Provisioning of Access Node Alias from a Management Console GUI

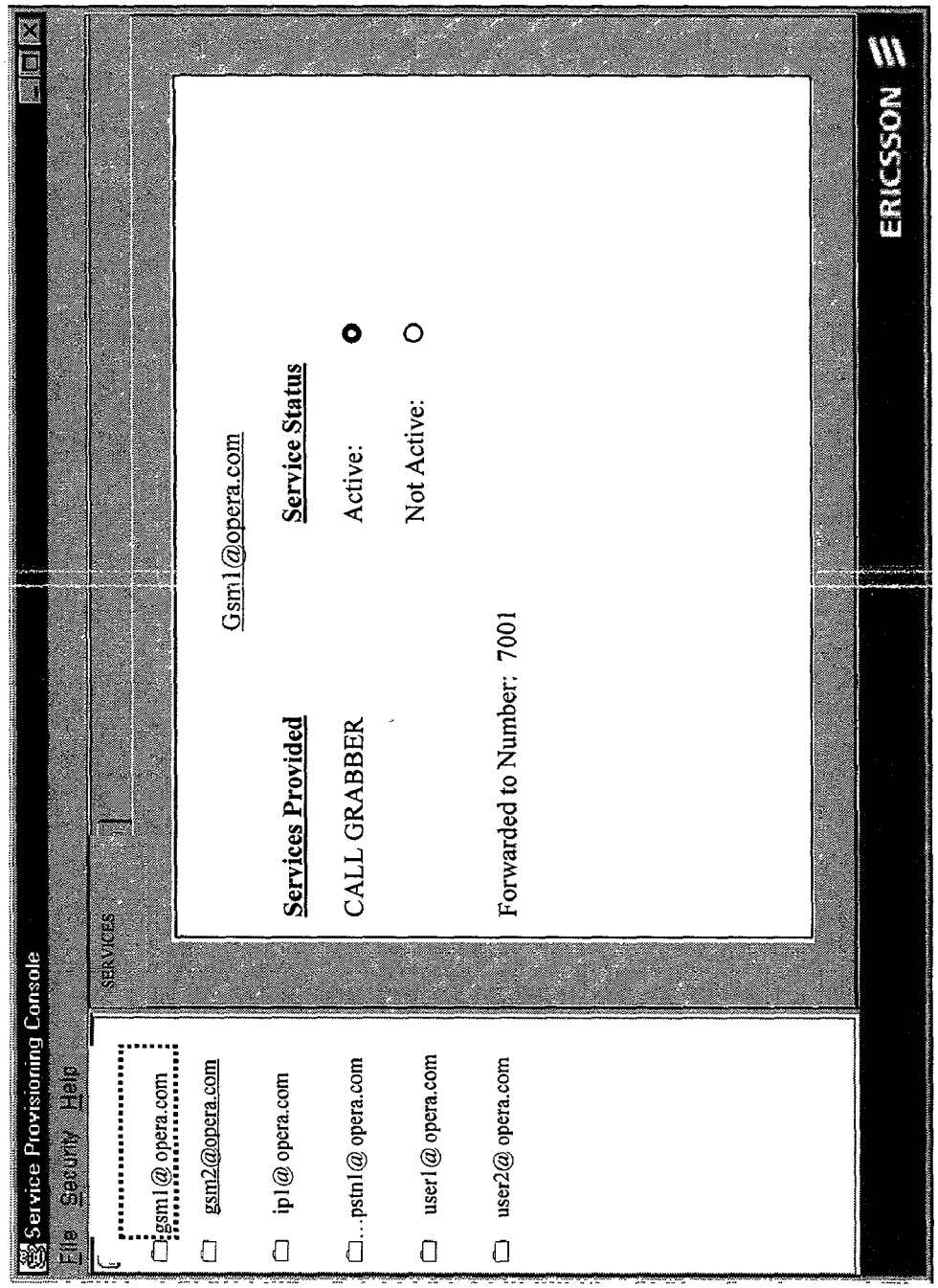
Figure 13: Setting Call Grabber Service Data

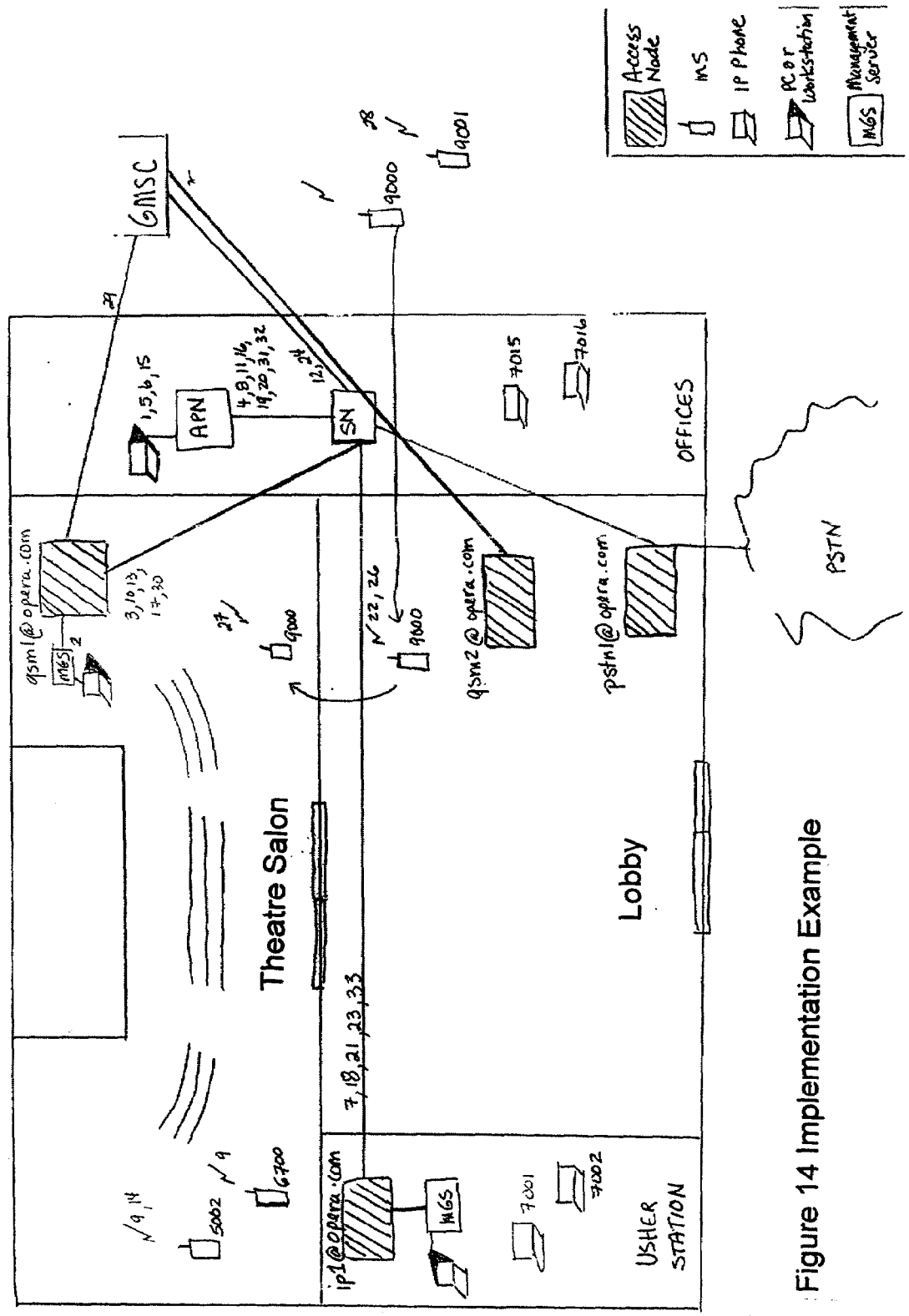
Figure 14 Implementation Example

SUPPLEMENTARY CALL GRABBER SERVICE FOR MOBILE NETWORKS

TECHNICAL FIELD

The present invention relates to the field of services provided in telecommunication networks, and particularly a service providing call interception in telecommunication systems providing user mobility.

BACKGROUND

The introduction of mobile telephones into society has created a number of social problems due to the fact that a person with a mobile telephone can be available any time, anywhere. Annoyances have been most notable in public group settings where group silence is essential to the experience or performance taking place. Examples of such experiences or performances are live performances, movie theatres, classrooms, conferences or even fine restaurants. Most people have today experienced the distraction of a ringing telephone during a crucial climax or punch line. Similar annoyances can be foreseen with the introduction of PC-phone applications into the business place, where PC-phone applications may disturb meetings, conferences or presentations.

There are several solutions presented to the problem situation described above. For mobile phones the most recent solution is the vibrating alert which replaces the normal ringing alert on incoming call. For PC-phones and mobile phones there are supplementary services as well, such as: Call forwarding, call diversion, screening and messaging services. In the very least, the user can simply turn off the mobile terminal or close down the PC-application. A problem with these solutions are that they rely on the called party to actively do something to prevent the telephone from ringing. However, experience has shown that, in this respect, one simply cannot rely on private persons to honour the privacy of the group.

SUMMARY

It is an object of the present invention to provide a solution for a call intercept service in a telecommunication network providing user mobility.

A method and arrangement in a telecommunication network according to "GSM on the Net" or "IPT" intercepts an incoming call for a user registered at an access node for which an intercept service is active. Depending on the type of called party identifier provided with the incoming call, the call is not delivered to the called party by the access node at which the called party is registered, but is instead routed to the service node. The service node identifies an alias of the access node and sends the access node alias with called party data to the application node. The application node returns to the service node a divert-to identifier associated with the access node, and the service node forwards the call to a different access node associated with the divert-to identifier for delivery of the call to the user identified by the divert-to identifier.

A mobile telephone network supplementary service, advantageously implemented in a "GSM on the Net" or IPT network, the supplementary service hereinafter refer to as "Call Grabber", is provided to handle situations as described in the introductory paragraphs above. The supplementary service is adapted to intercept incoming calls to mobile terminals registered at a certain location. At interception the call can for instance be diverted to a predefined local terminal or a messaging service. The novel supplementary service differs from known call forwarding, diversion and screening services in that it is based on location and access type, and not on user/number.

BRIEF DESCRIPTION OF THE DRAWINGS

FIG. 1 is a block schematic drawing illustrating the architecture of "GSM on the Net" or IPT telecommunication systems;

FIG. 2 is a schematic drawing illustrating GSM access node user registration;

FIG. 3 is a schematic drawing illustrating none mobile access node user registration;

FIG. 4 is a schematic drawing illustrating signalling for incoming MSISDN call to user with the user alias, wherein the mobile is within the GSM access node area coverage;

FIG. 5 is a schematic drawing illustrating signalling for an incoming call to a user alias;

FIG. 6 is a schematic drawing illustrating signalling for an incoming MSISDN call to a user without a user alias, for a terminal that is roaming into GSM access node coverage area;

FIG. 7 is a schematic drawing illustrating subscription and activation of a call diverting service according to the invention;

FIG. 8 is a schematic drawing illustrating signalling for call diverting according to the invention, for an incoming MSISDN call to a user with the user alias;

FIG. 9 is a schematic drawing illustrating signalling for call diverting, for an incoming MSISDN call to a user without a user alias; and FIG. 10 is a schematic drawing illustrating a signalling for call diverting, for an incoming call to a user alias.

FIG. 11 is a schematic drawing illustrating provisioning of access node alias via management console and provisioning console.

FIG. 12 is an exemplary snapshot to illustrate provisioning of access node alias from a management console GUI.

FIG. 13 is an exemplary snapshot to illustrate setting of "call grabber" service data.

FIG. 14 is a schematic drawing illustrating an implentation example of the present invention in a theatre, with APN. SN and access nodes defined in the system, wherein GSM1 node coverage area is the theatre salon, GSM2 node coverage area is the lobby, IP1 node coverage area is the usher station and the offices, and IP2 node acts as a gateway to the PSTN network.

DETAILED DESCRIPTION

For a better understanding of the invention, the technical background for a system which the application can apply will be explained in the following.

A non-limiting example system for which the invention can be applied advantageously is a system according to the GSM on the Net or according to IPT while the invention can also be applied to other, similar systems. In these aforementioned systems, a supplementary service can be provided by an application node server of the system, and be provided to, and activated for, access nodes of the system. Such systems can be deployed at business locations such as theatres, restaurants, conference centres, etc. A possible architecture of such a system is depicted in FIG. 1. The depicted system comprises an application node, an access node and service node, which could be implemented on servers running on Windows NT or Solaris™. These servers can be introduced into existing data networks. Typically, businesses already have their own data networks, so deployment could be just a matter of extending the network. Nodes according to GSM on the Net or IPT systems are typically connected to the intranet, and communication between nodes is handled over IP. With the use of IP addresses, ports and data flow signalling is routed to the correct destinations. Implementing GSM on the Net or IPT system nodes on standard servers is feasible, since these typically nodes do not carry any real-time traffic. In a small system, however, the functionality of the nodes could be co-located in one physical server. Though, in a large system there could be a need for more than one physical server. Typically, GSM on the Net or IPT is today based on the ITU-T recommendation H.323, which describes terminals, equipment and services for multimedia communication over a packet based network. The basic concept of H.323 is to separate the call control and the call connection. The call control function is involved mainly at the set up and tear down phases of the communication, and when the path is established, the actual data flow will be a real-time connection between the terminals concerned. In addition to call control, RAS signalling is used for communication between the access nodes and the service node. However, the system itself is protocol independent, and can easily be deployed according to other recommendations, such as for example SIP.

For a better understanding of the invention, further technical background with regard to the various nodes of the above-mentioned system is given in the next paragraphs.

The application node offers the possibility for higher level applications to interact with the network. Typically, the application node offers a web server for configuration of application services, referred to herein as the provisioning console. Preferably, service managers are allowed to connect remotely through Netscape™ or Internet Explorer™ to the web server, and to subscribe, unsubscribe, activate and de-activate a service via a graphical user interface (GUI). The provisioning console is also used to control service parameters, that may be applicable to other nodes to which the service is given.

The service node can be said to be the core of the system. The service node is responsible for registration of access nodes, and for registration and validation of users and call control signalling. It is through the functionality of the service node that user mobility is maintained. Typically, the service node has an interface (API) to the application node for triggering of application services.

The access node provides gateway functions for adapting access protocols and terminals (hardware or software devices) to the interfaces that the service node offers (such as, for example, H.323 or SIP). A system can include a plurality of access nodes, and the access nodes are responsible for management of terminal issues, such as terminal registrations. Multiple access nodes of one or several types can be deployed in the system, as is illustrated by FIG. 1. Examples of access nodes are PSTN voice gateways for PSTN phones, PC-client access nodes for PC-clients, UMTS access nodes for UMTS terminals, and GSM access nodes for GSM terminals. Access nodes register with a service node at startup. Using H.323 as an example, the access nodes sends the RAS registration request (RRQ) message to the service node, and receives the RAS registration confirm (RFC) message in return. A more detailed description the these procedures can be find in document ITU-T H.225.0, version 2. Specifically, the GSM access node would also contain MSC, VLR, BSC and BTS like functionality to be able to handle GSM terminals accessing the system. For wireless terminal access, the access node performs radio resource management, mobility management and communication management functions. The GSM access node serve as gateway between the air interface and the LAN environment. The GSM access node is involved when setting up a call to (or from) a GSM terminal. The node itself does not carry any traffic; it just controls the communication to the terminal. From a GSM macro network prospective, the GSM access node (and its underline structure of BTS' and terminals) is perceived as an arbitrary MSC/VLR service area in a network.

In a telecommunication system according to GSM on the Net or IPT, terminals can be hardware or software. Examples of terminals supported by the systems are GSM mobile terminals, Microsoft Net Meeting™, dialog 3413 IP phone of Ericsson, PSTN terminals, PBS DSET phones, etc. In these systems, terminals are connected via an access node, as described above, which manages specific issues relating to the terminal type. Multiple terminals can be connected to an access node, and multiple access nodes of one or several types can be deployed in a network according to GSM on the Net or IPT. This aspect is illustrated by the architecture depicted in FIG. 1.

In a communication network according to GSM on the Net or IPT, users are persons who can use the network for making a multimedia call. Typically, each user is defined by an E.164 number and/or email ID, which typically is provided to the system via the provisioning console. Such an E.164 number or email ID will be referred to herein as a user alias. Furthermore, an access node in the system can be defines with an E.164 number and/or email ID via the provisioning console thus representing a user. In this case, all persons logging in via these access nodes will appear as a single user to a system according to GSM on the Net or IPT. Such E.164 numbers and/or email ID's will be referred to herein as access node aliases.

Typically, the user aliases are published, and can be dialled or entered by a caller. On the other hand, the access node aliases are usually not published, and are intended for use only for routing within the system.

In a telecommunication system according to GSM on the Net or IPT, each user of the system is assigned a service node. When a user makes a login at a fixed terminal, it is the responsibility of the access node handling the terminal for consulting the service node to validate the login. In this case, the user alias is used for validation and registration, so it must match a predefined user alias. At successful validation, the service node registers the user in the application node, and stores the access node at which the user is currently registered. For mobile GSM terminals, however, as the terminal moves into the coverage area of a GSM access node, the GSM access node receives a location update. Then, the GSM access node sends the location update to the relevant PLMN macro network. In a system according to GSM on the Net or IPT, in the case that a terminal has been defined with the user alias, then the access node also consults the service node for validation and/or registration of the user alias.

With reference to FIG. 2 and the description above, user registration via a GSM access node will now be explained. As the GSM mobile terminal moves into the area of the GSM access node of the system, the GSM access node receives (20) a location update for the mobil terminal. The GSM access node sends (21) a MAP location update to a VLR of the GSM access node. The GSM access node sends (22) a MAP location update to the current GMSC. The current GMSC sends (23) a MAP location update to the applicable GSM HLR. The GSM access nodes sends (24) a registration request (with user alias) to the service node. The service node checks (25) if the user alias is defined. If the user alias is not defined, the service node sends (26) a registration reject message to the GSM access node. On the other hand, if the user alias is defined, then the service node sends (27) a registration information message to the application node. The application node acknowledges (28) the registration to the service node, and the service node sends (29) a registration confirm message to the GSM access node.

Now, with reference to FIG. 3, a typical user registration at an access node handling fixed terminals will be explained. Initially, the access node receives (30) a registration request for a user from a given terminal. The access node then sends (31) a registration request with user alias to the service node. The service node checks (32) if the user alias is defined. If, on one hand, the user alias is not defined, the device node sends (33) a registration reject message to the access node. On the other hand, if the user alias is defined, then the service node sends (34) applicable registration information the the application node. In turn, the application node acknowledges (35) the registration. The service nodes sends (36) a registration confirm message to the access node, and the access node sends (37) a registration confirm message to the terminal.

In state of the art systems, roaming between the GSM access node area and the external (PLMN) area is made in the normal way. A location update is sent to VLR/HLR when passing over to another location area. If the mobile terminal is inside the GSM access node coverage area, then the terminal is registered in the internal VLR (that is, the VLR functionality within the GSM access node), and the HLR in the PLMN will then point at the VLR. If the terminal is outside the office area covered by the GSM access node, then the terminal typically will be registered in some external VLR. In this situation, when a call is made to a mobile with its external MSISDN, then the (external) gateway MSC interrogates HLR (which knows in which VLR the mobile is registered). Typically, the HLR stores only the address of the subscriber's current VLR. The HLR must, therefore, query the subscriber's current VLR, which will assign a mobile station roaming number (MSRN) for the call. This MSRN is then returned to the HLR, and back to the GMSC, which then can route the call accordingly. In a typical GSM on the Net/IPT system of today, it will be the GSM access node comprising the VLR which will return the necessary routing information in order for a call to be delivered to the GSM terminal. If the mobile is defined with a user alias in the GSM on the Net/IPT system, then the GSM access node VLR will return a user alias as the MSRN. Based on this information, the call will then be routed from the GMSC to the service node with this user alias. A typical signalling sequence for an incoming MSISDN call to a user with a user alias is depicted in FIG. 4, with the mobile inside the GSM access node coverage area. By reference numeral (40) is indicated that a call I made to a mobile with its external MSISDN. The external GMSC uses the MSISDN to interrogate (41) the HLR in the PLMN network. Next, the HLR queries (42) the VLR of the GSM access node. Because the user has a user alias in the system, the VLR of the GSM access node allocates a user alias for the call, and returns (43) the user alias to the HLR. The HLR then sends (44) the user alias to the GMSC. Now, the call is set up (45) from the GMSC to the service node with the user alias. The service node checks (46) if the user is defines and registered. If so, this service node delivers (47) the call to the GSM access node. Now, the GSM node can page (48) the mobile terminal.

In a typical GSM on the Net/IPT system, a call is made to a fixed terminal, then the call will be made by dialling for entering the user alias by the calling user, and the call control signalling will be routed to the service node. For such a case, a typical event sequence is depicted in FIG. 5. By reference numeral (50) is indicated that a call is made with the user alias as the destination. The PSTN access node, or some other access node, then routes (51) the call to the service node. The service node then checks (52) if the user alias is defined and registered. If the service node finds that the user alias is defined and registered, then the service node delivers (53) the call to the applicable access node (where the user last registered). Now, the access node sets up (54) the call towards the terminal.

In any of the situations and scenarios described above, where the user is registered at an access node, the call will be signalled all the way through and delivered to the called party. Accordingly, the called party will also be notified of the incoming call to enable the called party to receive the call.

It is an object to provide a solution that will allow delivery of a call without generating a notification to the originally called party.

The call intercepting solution, hereinafter referred to as a call grabber, can advantageously be subscribed to at any time via a provisioning console. An access node to be given the call grabber service is defined with an access node alias via the provisioning console. Then, the call grabber service is provided to that particular access node alias. Furthermore, applicable parameters are also configured, such as access node, divert-to numbers, divert-to user alias, etc. Access node alias, service subscription and service configuration parameters are stored in the application node. However, this service node typically is not informed until the call grabber service is activated.

Activation of the call grabber service can be made at any time via the provisioning console. The application node will inform the service node, preferably by a proprietary API, as soon as the service is activated. The service node itself must keep record of information on which access node(s) the service is active. Activation can occur before or after an access node is registered in the service node, but if the access node is already registered, then the access node is informed immediately by the service node. On the other hand, if the access node is not registered, then it is informed of activation of the call grabber service by the service node as soon as the registration is completed.

Subscription and activation of the call grabber service can be better understood from the following explanation and with reference to FIG. 7. Initially, from the provisioning console, the access node to be given a service is assigned (70) an access node alias in the system. The call grabber service is provided to the access node alias, and the applicable parameters are configured (71). Also, subscription and service configuration parameters are stored (72) in the application node. The call grabber service is activated (73) from the provisioning console. The application node informs (74) the service node (advantageously over a proprietary API) that the service is activated and provides (74) the access node alias. The service node stores (75) information on which access node(s) the service is active, and the access node alias. However, activation can occur before or after an access node is registered in the service node. If the access node is registered, then the service node sends an IRQ message with call grabber active indicator to the access node. Otherwise, that is if the access node is not registered, then the service node waits (77) for registration. The access node stores call grabber active status, and sends (78) an IRR message to the service node. Referring to the example above, call grabber active information can be passed as a simple on/off bit, with, for example, a RAS IRQ message. Such an IRQ message will then contain non standard data (defined to carry proprietary data) which can be used to carry the call grabber activation information. An example of the H.323 IRQ ASN.1 tree intended for this purpose can be:

```
InfoRequest ::= SEQUENCE-(IRQ)
{
    requestSeqNum       RequestSeqNum,
    callReferenceValue  CallReferenceValue,
    nonStandardData     NonStandardParameter OPTIONAL,
    replyAddress        TransportAddress OPTIONAL,
    ...
}
```

The access node stores that the call grabber service is active, and responds to the IRQ with an IRR message. The information transfer can as well occur over SIP with applicable request/response messages from the service node to the access node. This is illustrated also in FIG. 7 by sequence reference numerals 73 through 78.

When the call grabber service is active at an access node, then the access node sends all call control signalling for "terminating calls" to the service node. Calls to users not defined with the user alias in the GSM on the Net/IPT system are also sent to the service node, while originating calls are not impacted.

With reference to FIG. 8, an incoming MSISDN call to a user with a user alias in a GSM on the Net/IPT system is described. If a call to a mobile is made with its external MSISDN, and the mobile is registered in the VLR of the GSM access node, then the external GMSC will interrogate the HLR (which knows in which VLR the mobile currently is registered), and asks for a MSRN. Since the mobile is defined with a user alias in the GSM on the Net/IPT system, the VLR of the GSM access node returns a user alias as the MSRN. Then, the call is routed from the GMSC to the service node with this user alias. The service node knows at which access node the user is registered, and upon checking that the call grabber service is active, the service node sends the access node alias and other called party data to the application node. The application node uses the access node alias to find pre-configured call grabber divert-to numbers/divert-to user alias, inserts the number in the called party data and orders the service node to continue routing the call with the provided divert-to number/divert-to user alias. For a better understanding, handling of an incoming MSISDN call to a user with a user alias in a situation where the call grabber service is active will be explained in the following by way of example and with reference to FIG. 8. Initially, a call is made to a mobile with its external MSISDN, as indicated in FIG. 8 by reference numeral 80. The external GMSC uses the MSISDN to interrogate (81) the HLR of the PLM network. The HLR in turn queries (82) the VLR of the GSM access node. The VLR of the GSM access node will allocate a user alias to the call, and return (83) the user alias to the HLR. Now, the HLR sends (84) the user alias to the GMSC. The GMSC routes (85) the call to the service node with the user alias. The service node determines (86) that the GSM access node where the user is registered has the call grabber service active. Based on this information, the service node inserts the access node alias in the call data and sends (87) the access node with the called party data to the application node. The application node inserts a divert-to number(s)/user alias as a new B-number/alias, and delivers (88) the call information back to the service node. Now, the service node delivers (89) the call to the applicable access node.

FIG. 9 shows a situation where an incoming MSISDN call is for a user without a user alias. This will be the situation wherein a call to a mobile is made with its external MSISDN, and the mobile is registered in the VLR of the GSM access node but does not have a user alias. The external GMSC will, in usual way, interrogate the HLR (which knows in which VLR the mobile is registered) and ask for a MSRN. Since the mobile does not have a user alias, the VLR of the GSM access node will return a MSRN. The call is then routed from the GMSC to the GSM access node with the MSRN received from the VLR. On is receiving the call, the GSM access node determines that the call grabber service is active, and delivers a call to the service node with the MSRN. On receiving the call from the GSM access node, the service node determines that the MSRN does not match any user alias, but that the delivering access node has the call grabber service active. Based on this information, the service node inserts the access node alias and sends the access node alias with othe called party data to the application node. The application node uses the access node alias to find pre-configured call grabber divert-to number(s)/divert-to a user alias, inserts the divert-to number/divert-to user alias in the called party data and orders the service node to continue routing the call with the inserted divert-to number(s)/divert-to user alias. For a better understanding of the call handling for an incoming MSISDN call to a user without the user alias, reference is again made to FIG. 9, exemplifying call handling in this situation. By reference numeral (90) is indicated that a call is made to a mobile with its external MSISDN. The external GMSC uses the MSISDN to interrogate (91) the HLR of the PLM network. The HLR queries (92) the VLR of the GSM access node. The VLR of the GSM access node allocates an MSRN to the call, and returns (93) the MSRN to the HLR. Next, the HLR sends (94) the MSRN to the GMSC. The call is then set up (95) from the GMSC to the GSM access node with the MSRN. The GSM access node determines that the call grabber service is active, and delivers (96) the call to the service node. The service node determines (97) that the MSRN does not match any user alias, but that delivering access node has the call grabber service active. The service node then inserts the access node alias in the call data, and sends (98) this information to the application node. The application inserts divert-to number(s)/divert-to user alias as a new B-number/alias, and delivers (99) this information back to the service node. Now, the service node delivers (100) the call to the applicable access node. In yet another aspect of the invention, a solution according to the invention is capable of intercepting an incoming call to a user alias. If a call to a mobile terminal, where any other type of terminal, is made with a user alias as the destination, then call control signalling is routed to the service node. The service node knows which access node the called user is registered at, and determines if the call grabber service is active for that particular access node. For an access node with the call grabber service active, the service node will insert the access node alias and send the access node alias with other called party data to the application node. The application node uses the access node alias to find pre-configured call grabber divert-to number(s)/divert-to alias, inserts the divert-to number(s)/divert-to user alias in the called party data and orders the service node to continue routing the call with the inserted information.

In FIG. 10, reference numeral (110) indicates that a call is made to a mobile terminal, or to some other terminal type, with the user alias, and that the call control signalling is routed to the service node. The service node knows, as explained earlier, at which access node the called user is registered, and determines (111) that the call grabber service is active for that particular access node. On determining that the call grabber service is active, the service node inserts the access node alias, and sends (112) the access node alias with other called party data to the application node. By reference numeral (113) is indicated that the application node uses the access node alias to final pre-configured call grabber divert-to numbers(s)/divert-to user alias, and that the application node inserts the divert-to information in the called party data. In this way, the application node effectively orders (114) the service node to continue routing the call with the inserted divert-to information. Accordingly, the service node delivers (115) the call to the applicable access node.

With reference to FIG. 11, node management will be explained. Node management is made available to a system administrator via a Management Server and a Management Console GUI. An essential part of the GUI is the network topology tree. The tree contains a representation of all the nodes in the IPT network. By clicking one of the nodes then the element manager for the corresponding server is opened and made available to the system administrator. A network node is configured from the management console through the GUI part of the node's management plug-in (1, 2).

With reference to FIG. 12, a way of providing the Access Node Alias will be explained. The Access Node Alias is provided via this Management console by a system administrator clicking the Access Node icon in the topology tree and then providing the alias in the appropriate panel.

With reference to FIG. 13, a way of defining the Access Node Alias as a user will be explained. The Access Node Alias must also be defined as a user in the system via the Provisioning Console. A Provisioning Console offers a similar GUI, where the Alias is defined (3). By Clicking on the Alias, the Call Grabber Service can be provided and or activated by a system administrator.

At initial start of the Access Node, it registers itself toward the SN. The registration will include the Access Node Alias previously provided via the Management Console. The SN checks that the Access Node Alias is defined in APN. The SN is responsible for translation and routing of Aliases to the proper Access Node.

In the example embodiment depicted in FIG. 14, the following preconditions are applicable:
a) APN, SN and Access Nodes are defined in the system.
b) GSM1 node coverage area is the Theatre Salon
c) GSM2 node coverage area is the Lobby
d) IP1 node coverage area is the Usher Station and the Offices
e) PSTN1 node acts as a gateway to the PSTN network.

Under the preconditions indicated in the paragraph above, the following steps describe the preparatory and operational steps performed according to the embodiment example depicted in FIG. 14:
1. The Alias gsm1@opera.com is defined as a User via Provisioning Console. The Provisioning Console informs APN.
2. The Access Node GSM1 is provided Access Node Alias: gsm1@opera.com via the Management Console. Management Server informs the GSM1 access node.
3. GSM1 access node sends a registration of itself to SN with the alias: gsm1@opera.com
4. The SN checks the alias with APN then confirms the registration
5. The Alias gsm1@opera.com is provided the Call Grabber Service via Provisioning Console. Call Grabber is defined with a re-routing number to IP Phone User 7001. The Provisioning Console informs APN.
6. Users aliases 5002, 6700, 7001, 7002, 7015 and 7016 are defined via the Provisioning Console. The Provisioning Console informs APN.
7. IP Phone users 7001, 7002, 7015 and 7016 register at IP1 Access Node. IP1 sends a registration request to SN.
8. The SN checks the user aliases with APN then confirms the registrations
9. MS 5002 and MS 6700 move into the theatre salon to prepare for the evening performance. The MS sends location updates to the GSM1 node
10. GSM1 sends user registrations to SN for User 5002 and 6700.
11. The SN checks the user aliases with APN then confirms the registrations.
12. User 9001 calls User 5002. The GMSC routes the call to SN
13. The SN routes the call to GSM1 access node
14. GSM1 node delivers the call to MS5002. The call is completed.
15. The performance is about to begin. Call Grabber is activated for alias gsm1@opera.com via the Provisioning Console. The Provisioning Console informs APN
16. The APN informs SN that Call Grabber is active for gsm1@opera.com.
17. The SN informs GSM1 node that Call Grabber Service is active
18. User 7015 calls User 6700 who is still in the Theatre salon. The call is routed to the SN.
19. The SN sees that GSM1 has Call Grabber active. The SN informs APN of incoming call to alias gsm1@opera.com.
20. The APN sees that Call Grabber is active for the user gsm1@opera.com and returns a new routing number 7001.
21. The SN routes the call to IP1 node. IP1 delivers the call to User 7001. The User 7001 takes a message for User 6700.
22. MS User 9000 moves into the Lobby. The MS sends location update to GSM2 node.
23. User 7016 calls User 9000. The call is routed to SN.
24. The SN routes call to GMSC.
25. The GMSC routes the call to GSM2 node.
26. Call grabber is not active for GSM2 node. GSM2 delivers the call to MS 9000. The call is completed.
27. MS 9000 moves into the Theatre Salon. The MS sends location update to GSM1 node.
28. User 9001 calls User 9000. The call is routed to GMSC.
29. The GMSC routes the call to GSM1 node.
30. Call grabber is active for GSM1. GSM1 node routes the call to SN.
31. The SN sees that GSM1 has Call Grabber active. SN informs APN of incoming call to alias gsm1@opera.com.
32. The APN sees that Call Grabber is active for the user gsm1@opera.com and returns a new routing number 7001.
33. The SN routes the call to IP1 node.
34. IP1 delivers the call to User 7001. The User 7001 takes a message for User 9000.

Advantages

When implemented in an appropriate system, the call grabber can be viewed as a community supplementary service. The call grabber service can then be employed to for example protect a group experience, other social functions, or a social service type of business to protect the integrity of the product (the product being a performance or a presentation) form personal behaviour.

Broadening

The service can be offered to GSM on the Net/IPT networks or systems, and can be applied to any kind of access type by simply deploying an access node for the new access type. Examples of such access types are UTMS access nodes for UTMS terminals, IP access nodes for IP phones, PBX access nodes for PBX phones, etc. The call grabber service can protect conferences, presentations and important meetings, etc., from disturbing phone calls. Furthermore, the call grabber service can be expanded to handle multiple divert-to numbers/divert-to user aliases, and to multiple or simultaneous call attempts to insure call completion. Also, the service could be expanded with an override feature which could allow emergency alls to specific users to override the call grabber service. To ensure proper operation of the call grabber service, it can also be enhanced with looping protection features.

Appendix "A"

Abbreviations, Definitions Acronyms.
(Particularly relevant items marked "X")

| | | ABBREVIATIONS, DEFINITIONS AND ACRONYMS. (Particularly relevant items marked "X") |
|---|---|---|
| | ANSI | American National Standardisation Institute |
| X | API | Application Programming Interface |
| | APN | Access Point Name |
| X | ARQ | Admission Request (e.g. H.323) |
| | ASCII | American Standard Code for Information Interchange |
| X | ASN.1 | Abstract Syntax Notation Number 1 (a formal data structure definition language) |
| X | BSC | Base Station Controller |
| X | BTS | Base Transceiver Station |
| | CGI | Common Gateway Interface |
| | CGI | Common Gateway Interface (a script language used for customisation of web page contents) |
| | Codec | Coder/Decoder |
| | Corba | A structured design language |
| | DTMF | Dual Tone Multiple Frequency |
| | DTMF | Dual Tone Multiple Frequency |
| X | E-164 | A standard numbering scheme |
| | ETSI | European Telecommunication Standards Institute |
| | GK | Gatekeeper |
| X | GMSC | Gateway Mobile Switching Centre |
| | GPRS | General Packet Radio Service |
| | GPRS | General Packet Radio Service (http://www.etsi.org/smg/work/gprs_spec.htm) |
| X | GSM | Global System for Mobile Communication (a widely employed standard for mobile communication) |
| X | GUI | Graphical User Interface |
| X | HLR | Home Location Register |
| | HTTP | Hyper Text Transport Protocol |
| | HTTP | Hypertext Transfer Protocol (a MIME (ASCII) encoded protocol for transport of World-wide-web data.; The protocol is open for tunnelling of other protocols). |
| | HW | Hardware |
| | IMSI | International Mobile Subscriber Identity - allocated for each mobile subscriber |
| X | ID | Identifier |
| X | IP | Internet Protocol |
| X | IPT | Internet Telephony |
| X | ISDN | Integrated Services Digital Network |
| X | ISP | Internet Service Provider |
| | ITU H.225.0 | A subset of the H.323 standards suite being based on Q.931 and defining call control messages, encoding standards and call-state sequences. |
| | ITU H.245 | ITU-T Recommendation, "Control protocol for multimedia communication", February 1998. |
| X | ITU H.323 | ITU-T Recommendation, "Packet-based multimedia communications system", February 1998, specifies signalling and transport for multimedia traffic over a packet switched network. (A family of ASN.1 encoded protocols defining message formats, encoding standards and call state sequences of multimedia conferences on an Internet protocol infrastructure.) |
| | ITU H.450 | A suite of ASN.1 standards defining service control protocols to be used for service control in an H.323 network. The H.450 messages are being carried within H.225.0 messages. |
| | ITU Q.931 | Telephony standard for call control that defines call control messages, encoding standards and call-state sequences. |

-continued

| | ABBREVIATIONS, DEFINITIONS AND ACRONYMS. (Particularly relevant items marked "X") | |
|---|---|---|
| X | ITU-T | International Telecommunication Union - Telecommunications sector |
| X | MAP | Mobile Application Part |
| | MGCP | Media Gateway Control Protocol (an alternative to H.323; Arango, M., A. Dugan, I. Elliott, C. Huitema, S. Pickett, "Media Gateway Control Protocol (MGCP), work in progress"). |
| | MIME | Multipart Information Message Entity Protocol encoding format based on ASCII characters |
| X | MS | Mobile Station |
| X | MSC | Mobile Switching Centre |
| X | MSISDN | Mobile Station ISDN (number) |
| X | MSRN | Mobile Station Roaming Number |
| | NAT | Network Address Translation |
| | NCC | Network Control Centre |
| | NSAPI | Network layer Service Access Point Identifier. The NSAPI identifies the PDP context associated with a PDP address. |
| | NTTP | Network News Transfer Protocol: Protocol for transport/exchange of news messages |
| X | PBX | Private Branch Exchange |
| X | PC | Personal Computer |
| | PDA | Personal Digital Assistent |
| | PDP | Packet Data Protocol |
| | PDPAddress | PDP address, e.g. an X.121 or an IP address. An MS subscriber identified by an IMSI shall have one or more network layer addresses associated that conforms to the standard addressing scheme of the respective layer service used, e.g. IP. |
| | PDPType | PDP type, e.g. X.25 or IP |
| X | PLMN | Public Land Mobile Network |
| | PNP | Private Numbering Plan |
| X | PSTN | Public Switched Telephone Network |
| | QoSNegotiated | Quality of Service profile negotiated |
| | QoSRequested | Quality of Service profile requested |
| | QSIG | A service control protocol used by PBX |
| | RAB | Radio Access Bearer |
| X | RAS | Registration, Admission and Status |
| X | RCF | Registration Confirm (e.g. H.323) |
| | RMI | Remote Method Invocation |
| | RNC | Radio Network Controller |
| | RR | Radio Resources |
| X | RRQ | Registration Request (e.g. H.323) |
| | RTP | Real Time Protocol |
| | S/MIME | Secure MIME |
| | Satellite-PL | Satellite Payload |
| | SGSN | Serving GPRS Support Node |
| X | SIP | Session Initiation Protocol |
| X | SIP | "SIP, Session Initiation Protocol", Internet Engineering Task Force, RFC 2543, |
| X | SIP | "SIP, Session Initiation Protocol", Internet Engineering Task Force, RFC 2543, March 1999, (Handley, M., Schulzrinne, H., Schooler E., Rosenberg J) |
| X | SIP | Session Initiation Protocol: IP Telephony protocol based on HTTP |
| | SM | Session Manager |
| | SMS | Short Message Service |
| | SMS | Short Message Service (Messaging service protocol employed within GSM Secure Socket Layer) |
| | SMTP | Simple Mail Transfer Protocol: Protocol for transport/exchange of email messages |
| | TAPI | Telephone Application Programming Interface |
| | TCP | Transmission Control Protocol |
| | TI | Transaction Identifier |
| | TLS | Security protocol employed for Transport Layer Security |
| | TTC | Telecommunications Technology Committee (Japan) |
| | UDP | User Datagram Protocol |
| X | UMTS | Universal Mobile Telecommunication System |
| X | UMTS | Universal Mobile Telephone System (http://www.umts-forum.org) |
| | UT | User Terminal (Mobile Station) |
| | VC | Virtual Connection |

-continued

| ABBREVIATIONS, DEFINITIONS AND ACRONYMS. (Particularly relevant items marked "X") | | |
|---|---|---|
| X | VLR | Visitor Location Register |
| | VPI/VCI | Virtual Path/Virtual Connection Identifiers |
| | VPN | Virtual Private Network |
| | WAP | Wireless Application Protocol |
| | WAP | Wireless Application Protocol |
| | WAP | Wireless Access Protocol: a web protocol for mobile devices (i.e. "a-kind-of" HTTP for mobile handsets) |

The invention claimed is:

1. A packet-based telecommunication network call control and signalling method for intercepting an incoming call destined for a user registered at an access node of the network, the network having an architecture of interworking nodes and further comprising a service node, an application node, and optionally a plurality of further access nodes and a gateway to an external telecommunication network, said method comprising:
receiving, in the service node, a first call control signal comprising called user data;
determining whether an intercept service is active or not active for the access node at which the user is registered;
if the call intercept service is active:
determining an access node alias of the access node;
transferring the access node alias and called user data to the application node;
determining, by the application node, a predefined divert-to identifier applicable to the access node alias;
transferring to the service node the divert-to identifier and called user data including a service node command to continue routing the call on basis of the divert-to identifier; and
delivering the call to a node identified by the divert-to identifier; and
if the call intercept service is not active:
routing, by the service node, the call on basis of the called user data and the access node at which the user is registered.

2. The method of claim 1, further comprising:
determining, by the access node, that a respective call intercept service is active and forwarding the call to the service node.

3. The method of claim 1, wherein the network is according to Global System for Mobile Communication (GSM) on the Net or Internet Telephony (IPT).

4. The method of claim 3, wherein the incoming call originates through a GSM adapted second network, and wherein the access node is a GSM access node and the called party user alias is a Mobile Station Integrated Services Digital Network (MSISDN) number, the method further comprising:
maintaining the user alias in a Visitor Location Register (VLR) associated with the access node at which the user is registered in the network;
allocating to the incoming call the user alias in the VLR associated with the access node; and
forwarding the user alias to a GSM Switching Center (GMSC) of the second network, so as to allow the GMSC to route the incoming call to be received in the service node of the network with the user alias.

5. An incoming telephone call intercepting and delivering call control and signalling method in a first packet-based network, said first network operating according to Global system for Mobile Communication (GSM) on the Net or Internet Telephony (IPT), said call being originated through a mobile telephone second network and destined for a called party with a Mobile Station Integrated Services Digital Network (MSISDN) number and registered at an access node in said first network with the MSISDN as a user alias, said access node having an access node alias and maintaining in an associated Visitor Location Register (VLR) the user alias for the called party, said method comprising:
creating records in a service node of the first network and the access node, the records indicating that a call intercept service is active for the access node alias,
creating in an application node of the first network a record of at least one divert-to identifier associated with the access node alias,
allocating the user alias in the VLR associated with the access node to the call,
forwarding the user alias to a GSM Switching Center (GMSC) of the second network,
routing the call from the GMSC to the service node with the user alias,
examining the record by the service node and determining that a call intercept service for the access node alias associated with the user alias is active,
forwarding from the service node to the application node of the first network an access node identifier associated with the access node alias and called party data,
forwarding from the application node to the service node, on basis of the access node identifier and the called party data, the at least one divert-to identifier, and
routing in the first network the call to a destination identified by the at least one divert-to identifier.

6. An incoming telephone call intercepting and delivering call control and signalling method in a first packet-based network, said first network operating according to Global System for Mobile Communication (GSM) on the Net or Internet Telephony (IPT), said call being originated through a GSM adapted second network and destined for a called party user without a user alias at a GSM terminal with a Mobile Station Integrated Services Digital Network (MSISDN) number and registered at a GSM access node of said first network, said GSM access node having an access node alias, said method comprising:
creating records in a service node of the first network and the GSM access node, the records indicating that a call intercept service is active for the GSM access node,
creating in an application node of the first network a record of at least one divert-to identifier associated with the access node alias, maintaining a Mobile Station Roaming Number (MSRN) for the GSM terminal of the called part user in a Visitor Location Register (VLR) associated with the access node at which the user is registered in the network, allocating to the incoming call the MSRN in the VLR associated with the access node, forwarding the MSRN to a Home Location Register (HLR) associated with a GSM Mobile Switching Centre (GMSC) of the GSM adapted second network, routing the call from GMSC to the GSM access node with the MSRN, the GSM access node determining that the call intercept service is active and delivering the call to the service node with the MSRN, the service node determining that the MSRN does not match any user alias and that the GSM access node has the call intercept service active, inserting the access node alias, and sending the access node alias and other data to the application node, and the application node using the access node alias to determine a call divert-to identifier, inserting the divert-to identifier, and ordering the service node to continue routing the call with the inserted divert-to identifier, and delivering the call from the service node to a node identified by the at least one divert-to identifier.

7. Apparatus for use with a call control and signalling arrangement in a telecommunication network for intercepting an incoming call destined for a user registered in the network, the network having an architecture of interworking nodes and comprising call routing means, a service node, an application node, at least one access node having an access node alias, and optionally, a gateway to an external telecommunication network, the service node and the access node each including a record of an indicator for a call intercept service being active for the access node, the application node including a record of least one divert-to identifier associated with the access node alias, wherein the service node comprises:
means for determining, on reception of an incoming call control signal, an access node alias of an access node for which a call intercept service is active,
means for holding routing of an incoming call for a user registered at the access node having the access node alias for which an intercept service is active, and
means for communicating the access node alias to the application node;

wherein the application node comprises:
means for determining, on reception of the access node alias, a pre-defined divert-to identifier, and
means for issuing to the service node routing information including the divert-to identifier; and wherein the service node comprises:
means for call routing;
means for providing to the call routing means the routing information for routing of the incoming call to a location associated with the divert-to identifier.

8. Apparatus for use with a call control and signalling arrangement in a telecommunication network for intercepting an incoming call destined for a user registered in the network, the network having an architecture of interworking nodes and comprising call routing means, a service node, an application node, at least one access node having an access node alias, and optionally, a gateway to an external telecommunication network, the service node and the access node each including a record of an indicator for a call intercept service being active for the access node, the application node including a record of least one divert-to identifier associated with the access node alias, wherein the service node comprises electronic circuitry programmably configured to:
determine, on reception of an incoming call control signal, an access node alias of an access node for which a call intercept service is active,
hold routing of an incoming call for a user registered at the access node having the access node alias for which an intercept service is active, and
communicate the access node alias to the application node;

wherein the application node comprises electronic circuitry programmably configured to:
determine, on reception of the access node alias, a pre-defined divert-to identifier, and
issue to the service node routing information including the divert-to identifier; and wherein the service node comprises electronic circuitry programmably configured to:
route a call; and
provide of the call routing means the routing information for routing of the incoming call to a location associated with the divert-to identifier.

* * * * *

UNITED STATES PATENT AND TRADEMARK OFFICE
CERTIFICATE OF CORRECTION

PATENT NO. : 7,369,844 B2 Page 1 of 1
APPLICATION NO. : 10/101088
DATED : May 6, 2008
INVENTOR(S) : Hestir It is certified that error appears in the above-identified patent and that said Letters Patent is hereby corrected as shown below:

On the Face Page, in Field (56), under "U.S. PATENT DOCUMENTS", in Column 2, Line 4, delete "409/245" and insert -- 709/245 --, therefor.

In Column 8, Line 19, after "On" delete "is".

In Column 11, Line 5, delete "Broadening".

In Column 17, Line 2, in Claim 6, delete "part" and insert -- party --, therefor.

In Column 18, Line 43, in Claim 8, delete "of" and insert -- to --, therefor.

Signed and Sealed this

Thirteenth Day of January, 2009

JON W. DUDAS
*Director of the United States Patent and Trademark Office*